US005710898A

United States Patent [19]
Tozuka

[11] Patent Number: 5,710,898
[45] Date of Patent: Jan. 20, 1998

[54] INFORMATION PROCESSING APPARATUS EMPLOYING HELP FUNCTION

[75] Inventor: Akira Tozuka, Hamamatsu, Japan

[73] Assignee: Yamaha Corporation, Japan

[21] Appl. No.: 404,026

[22] Filed: Mar. 14, 1995

[30] Foreign Application Priority Data

Mar. 15, 1994 [JP] Japan ................................. 6-043893

[51] Int. Cl.[6] ............................................. G06F 3/00
[52] U.S. Cl. ................................................. 395/338
[58] Field of Search ............................. 395/155–161, 395/338

[56] References Cited

U.S. PATENT DOCUMENTS

| | | | |
|---|---|---|---|
| 5,160,799 | 11/1992 | Tozuka et al. | 84/653 |
| 5,361,672 | 11/1994 | Koyoma | 395/155 X |
| 5,410,941 | 5/1995 | Hotta et al. | 84/601 |
| 5,434,965 | 7/1995 | Matheny et al. | 395/159 |
| 5,546,521 | 8/1996 | Martinez | 395/338 |

FOREIGN PATENT DOCUMENTS 5-27753  2/1993  Japan .

*Primary Examiner*—Raymond J. Bayerl
*Assistant Examiner*—A. Katbab
*Attorney, Agent, or Firm*—Graham & James LLP

[57] ABSTRACT

An information processing apparatus comprises a plurality of function operating elements for designating execution of a plurality of functions, respectively, and a help operating element for designating display of explanations and/or instructions related to information displayed on the display screen of the display device. A CPU is responsive to operation of the help operating element, for controlling the display device to display explanations and/or instructions related to the information displayed on the display screen. The CPU is further responsive to operation of each of the function operating elements taking place during the display of the explanations and/or instructions responsive to the operation of the help operating element, for controlling the display device to display explanations and/or instructions related to the each function operating element.

5 Claims, 18 Drawing Sheets

NORMAL VIEW

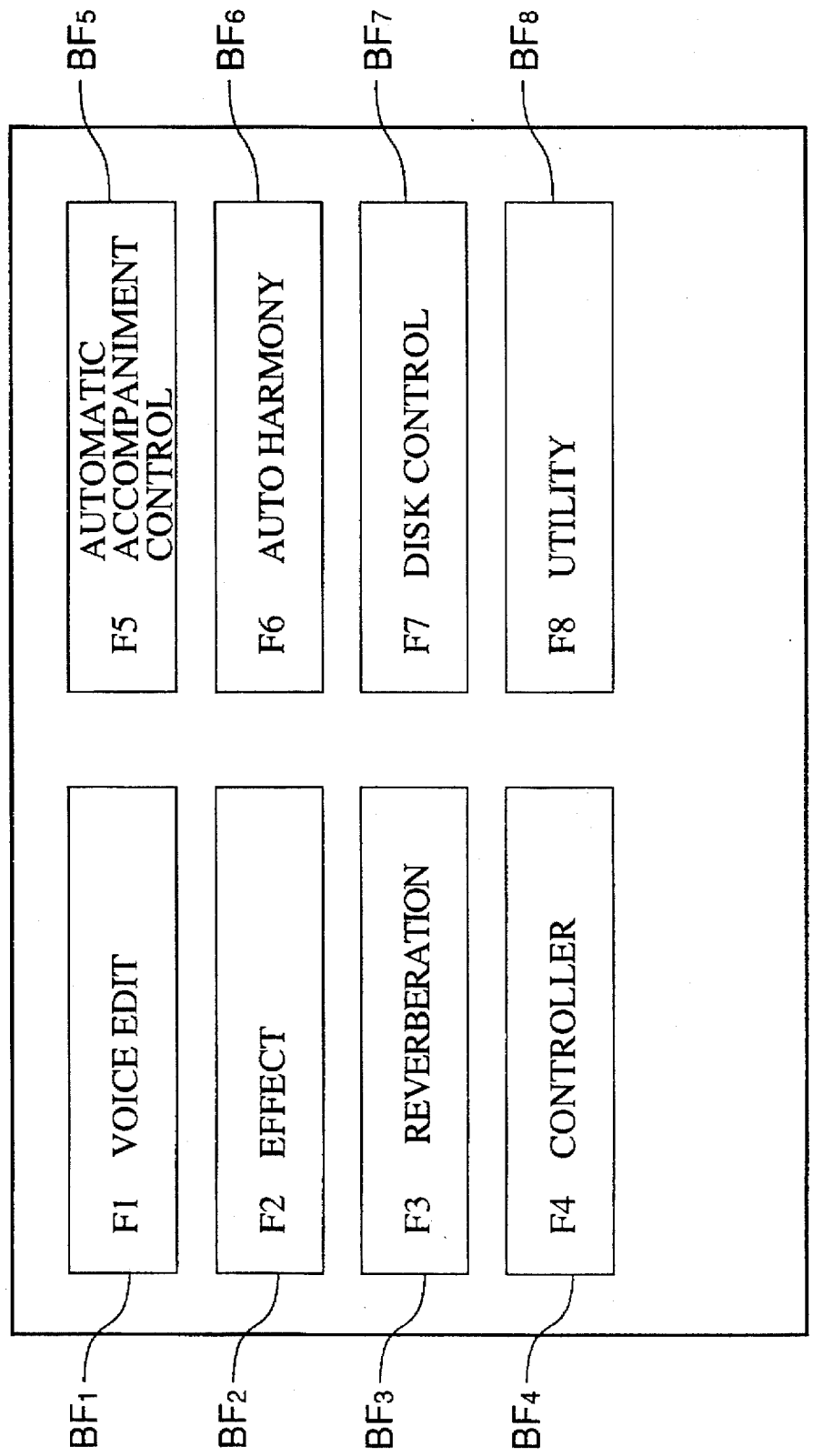

FIG.5 F2 EFFECT-SETTING VIEW

F2 EFFECT

| TYPE | * | TREMOLO 3 | B ☐ | C ☐ | 01 ☐ | 02 ☐ |
|---|---|---|---|---|---|---|
| DEPTH | | | | | | |

EFFECT TYPE      DEPTH

TREMOLO   CHORUS   FLANGE   SYNPHONIE

1 : 1     4 : 1     6 : 1     8 : 1
2 : 2     5 : 2     7 : 2     9 : 2
3 : 3

FIG.6
DISK READOUT VIEW from DISK

FILE NUMBER : 02
FILE NAME : DO-RE-MI
SIZE : 14K

[EXECUTE]

FILE LIST

| | | | |
|---|---|---|---|
| 05 : MY_FILE05 | 28K | 04 : Autumn Leaves | 25K |
| 01 : DATA_1 | 35K | 06 : MY_FILE02 | 28K |
| 02 : DO-RE-MI | 14K | 10 : Synphonie 2 | 50K |
| 03 : Blue Moon | 32K | 15 : DATA_2 | 20K |

FIG. 7

BUTTON HELP FOR SPLIT SWITCH

2/2

SPLIT

· A voice selected from ORCHESTRA 2 will be sounded if you operate keys on the right-hand side of the keyboard split point, and a voice selected from ORCHESTRA 1 if you operate keys on the left-hand side of the keyboard split point.

♀ The sounded voice is automatically transposed one octave up.

· Click the "J" button, and then the view will change to "SPLIT POINT/ABC MOD", where you can change the split point.

BUTTON HELP FOR PAD SWITCH

1/5

- You can use three functions selected by the MODE SELECT switch.

MULTI PAD
- You can select PHRASE PAD to record/playback the performance of ORCHESTRA 1 or CHORD PAD to record/playback the chord progression.

HOW TO RECORD/PLAYBACK
1. Hold down one of PAD switches while holding down the rec. switch.
2. Recording will start upon start of performance by operation of the upper keyboard area if PHRASE PAD is selected, and by operation of the lower keyboard area if CHORD PAD is selected.
3. To terminate the recording, press the rec. switch again.
4. To playback the recorded performance, press a desired PAD switch.

FIG.9

BUTTON HELP FOR PAD SWITCH  3/5

- You can use three functions selected by the MODE SELECT switch.

PERC. PAD
- You can assign percussion sounds to four PAD switches and playback them as desired.

HOW TO ASSIGN AND CATALOGUE
1. Press the rec. switch, and then operation of the keyboard will generate sound of a drum kit tone color.
2. Hold down a PAD switch while you choose and depress a key of a tone which you want to assign, and then the tone will be assigned to the PAD switch with a volume corresponding to the key depression strength.

FIG.10

BUTTON HELP FOR EFFECT SWITCH

1/1

EFFECT

· Set EFFECT on/off, and then the set EFFECT will be exerted on tones from ORCHESTRA 1, ORCHESTRA 2, and AUTOMATIC ACCOMPANIMENT (except rhythm tone).

Present Set values
Type: Tremolo 3
Depth: 20
Wheel: not controlled

· Click the J1 button, and then you can set the type and depth of effect on the view "F2 EFFECT".
· Click the J2 button, and then you can assign the effect function to the wheel on the view "F4 CONTROLLER".

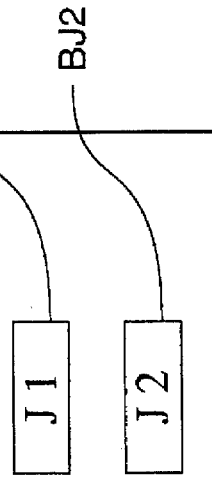

BJ1
BJ2
J1
J2

PAGE 2 OF BUTTON HELP FOR ABC SWITCH

FIG.12

VIEW HELP FOR NORMAL VIEW

1/5

HOW TO USE HELP
- Press the HELP button, and then you can see explanations and/or instructions on the view.
- Press another button on the panel after pressing the HELP button, and then you can seen explanations and/or instructions on the pressed button.

HOW TO QUIT HELP
- Press the HELP button again.

LANGUAGE
- Select the desired language by the UP/DOWN switch:

<u>Japanese</u>

English

German

French

FIG.13

VIEW HELP FOR NORMAL VIEW

2/5

VOLUME
- You can change the lower half of the view to VOLUME, SPLIT/ABC, and TRANSPOSE/TUNE, by operating switches on both sides of the LCD.

VOLUME
- You can adjust the volumes of ORCHESTRA 1 and ORCHESTRA 2 for manual play, and the volumes of CHORD, BASS, and RHYTHM for automatic accompaniment.

TEMPO
- You can set the tempo value.

FIG.14

VIEW HELP FOR DISK READOUT VIEW from DISK

- The indication of the file list changes depending upon a normal data disk or an exclusive style disk, which is used.
- If you load data from a floppy disk, presently set data will be erased.

How to Load from Normal Data Disk
1. Choose a file where data you want to load is entered, by the UP/DOWN switch.
2. Press the EXECUTE button.
3. Click the YES button when an acknowledgement message appears.
4. After the data has been loaded, the mode will automatically return from "from DISK" to normal automatic performance.

1/2

5,710,898

INFORMATION PROCESSING APPARATUS EMPLOYING HELP FUNCTION

BACKGROUND OF THE INVENTION

1. Field of the Invention

This invention relates to an information processing apparatus such as an electronic musical instrument, and more particularly to an information processing apparatus which has a so-called help function of displaying explanations and/or instructions on manners of operating the apparatus on a display device.

2. Prior Art

Conventionally, there are known electronic musical instruments which are provided with a help switch and constructed such that when a desired switch such as a tone color switch is operated while the help switch is operated at the same time, a help view with explanations and/or instructions ("help" explanations and/or instructions) on the operated switch is displayed on a display device (help function).

Further, conventional electronic musical instruments include a type with a large-sized display device, which has a view-selecting switch for selectively changing a view to be displayed on the display device. This type of electronic musical instrument is adapted to perform various functions including functions of setting the tone color and assigning functions to switches, in relation to information indicated on the view.

The help function provided in this type of electronic musical instrument, however, comprises only a help function of displaying explanations and/or instructions on functions and/or operating manners of switches. Therefore, the operator cannot recognize the current state or mode in which the electronic musical instrument is operating.

Further, conventionally electronic musical instruments are known, which have a plurality of switches related to each other and having a common help view for displaying explanations and/or instructions on functions and/or operating manners of the switches. However, if the common help view extends over a plurality of pages, an operation is required of the operator to search for a page on which are indicated explanations and/or instructions for a particular switch for which help is desired by the operator.

Moreover, also in the case of operating elements such as pad switches which can be selectively set to perform a plurality of different functions through operation thereof, if a help view for these switches extend over a plurality of pages, the operator has to operate a page-selecting switch or the like to search for a page on which are indicated explanations and/or instructions on a function which a pad switch or a like switch is currently set to perform through operation thereof.

Further, in the case of selection switches, which can be selectively set to perform functions of setting of tone colors, rhythms, etc. and on-off switches for selecting effects such as modulation, reverberation, and other effects, the tone color, rhythm and/or effects of musical tones generated change depending upon settings of these switches. In the conventional electronic musical instruments, however, it is difficult to grasp the current settings of these switches accurately and easily.

Besides, in the conventional electronic musical instruments, if the operator desires to change the settings of the selection switches for enabling selection of tone colors, rhythms, etc. or other switches, he cannot readily understand which operating element should be operated and/or how to operate the same even with the aid of the help function unless he is fully familiar with his electronic musical instrument.

SUMMARY OF THE INVENTION

It is an object of the invention to provide an information processing apparatus which has an improved help function and therefore greatly facilitates operation thereof.

To attain the object, according to a first aspect of the present invention, there is provided an information processing apparatus comprising:

display means having a display screen;

a plurality of function operating elements for designating execution of a plurality of functions, respectively;

a help operating element for designating display of explanations and/or instructions related to information displayed on the display screen of the display means; and control means responsive to operation of the help operating element, for controlling the display means to display explanations and/or instructions related to the information displayed on the display screen, on the display screen of the display means;

the control means being responsive to operation of each of the function operating elements taking place during the display of the explanations and/or instructions responsive to the operation of the held operating element, for controlling the display means to display explanations and/or instructions related to the each function operating element, on the display screen of the display means.

With the above arrangement, the operator can grasp a current state or mode in which the electronic musical instrument is operating, for example, what setting operation can be made, from explanations and/or instructions displayed on the display screen immediately after operation of the help operating element such as a help switch. Further, the operator can also recognize, for example, a current state, setting, and function, in or to which a function operating element such as various function operating switches is currently set, from explanations and/or instructions displayed on the display screen immediately after operation of the function operating.

According to a second aspect of the invention, there is provided an information processing apparatus comprising:

display means having a display screen;

a first plurality of function operating elements for designating execution of a plurality of functions, respectively;

a help operating element for designating display of explanations and/or instructions related to information displayed on the display screen of the display means; and control means for controlling the display means to selectively display on the display screen of the display means explanations and/or instructions related to a second plurality of mutually related function operating elements of the first plurality of function operating elements, which extend over a plurality of pages corresponding, respectively, to the second plurality of function operating elements;

the control means being responsive to operation of the help operating element and operation of each of the mutually related function operating elements concomitant with the operation of the help operating element, for controlling the display means to immediately display a page of explanations and/or instructions corresponding to the each function operating element, on the display screen of the display means.

With above arrangement, even in the case where a plurality of mutually related function operating elements such as a plurality of function operating switches, have a common help view which extends over a plurality of pages, the operator need not search for a page of the help view corresponding to a particular function operating element which has been operated, and can readily understand a function to which the function operating element is set to perform, etc., from explanations and/or instructions immediately or initially displayed after the operation of the function operating element.

According to a third aspect of the invention, there is provided an information processing apparatus comprising:

display means having a display screen;

a plurality of function operating elements for designating execution of a first plurality of functions, respectively;

assigning means for selectively assigning a second plurality of functions to each of at least one of the function operating elements;

a help operating element for designating display of explanations and/or instructions related to information displayed on the display screen of the display means; and control means for controlling the display means to selectively display on the display screen of the display means explanations and/or instructions related to the second plurality of functions assignable to the each of the at least one function element, which extend over a plurality of pages corresponding, respectively, to the second plurality of functions;

the control means being responsive to operation of the help operating element and operation of the each of the at least one function operating element concomitant with the operation of the help operating element, for controlling the display means to immediately display a page of explanations and/or instructions corresponding to one of the second plurality of functions which is currently assigned to the each of the at least one function operating element, on the display screen of the display means.

With the above arrangement, even in the case of function operating elements such as pad switches which can be selectively set to perform a plurality of functions, respectively, and have a common help view which extends over a plurality of pages corresponding, respectively to the plurality of functions, the operator need not search for a page of the common help view corresponding to a function to which a particular function operating element is currently set to perform, and can recoginze the function, etc. from explanations and/or instructions on the function immediately or initially displayed after the operation of the function operating element.

According to a fourth aspect of the invention, there is provided an information processing apparatus comprising:

display means having a display screen;

a plurality of function operating elements for designating execution of a first plurality of functions, respectively;

assigning means for selectively assigning a second plurality of functions to each of at least one of the function operating elements;

a help operating element for designating display of explanations and/or instructions related to information displayed on the display screen of the display means; and control means responsive to operation of the help operating element and operation of the each of the at least one function operating element concomitant with the operation of the help operating element, for controlling the display means to display explanations and/or instructions related to one of the second plurality of functions which is currently assigned to the each of the at least one function operating element, on the display screen of the display means.

With the above arrangement, in the case of function operating elements such as selection switches which can be selectively set to perform functions of setting tone colors, rhythms, etc. and on-off switches for selecting effects such as modulation, reverberation, and effects, the operator can grasp the current settings of these switches accurately and easily.

According to a fifth aspect of the invention, there is provided an information processing apparatus comprising:

display means having a display screen;

a plurality of function operating elements for designating execution of a first plurality of functions, respectively;

assigning means for selectively assigning a second plurality of functions to each of at least one of the function operating elements;

a help operating element for designating display of explanations and/or instructions related to information displayed on the display screen of the display means;

view-jumping means for designating changing a view to be displayed on the display screen of the display means; and control means responsive to operation of the help operating element and operation of each of the at least one function operating element concomitant with the operation of the help operating element, for controlling the display means to display explanations and/or instructions related to the second plurality of functions which are assignable to the each of the at least one function operating element, on the display screen of the display means;

the control means being responsive to operation of the view-jumping means taking place during the display of the explanations and/or instructions responsive to the operation of the help operating element and the operation of the each of the at least one operating element, for controlling the display means to display a setting view for executing assignment of one of the second plurality of functions to the each of the at least one function operating element, on the display screen of the display means.

With the above arrangement, in the case of function operating elements which can be selectively set to perform a plurality of functions, such as selection switches for enabling selection of tone colors, rhythms, etc. when the operator wants to change settings of such a function operating elemenet, can readily understand which operating element should be operated and/or how to operate the same from explanations and/or instructions displayed through operation of the view-jamping means.

The above and other objects, features, and advantages of the invention will be more apparent from the following detailed description taken in conjunction with the accompanying drawings.

BRIEF DESCRIPTION OF THE DRAWINGS

FIG. 4 is a diagram showing, by way of example, a function-selecting view;

FIG. 5 is a diagram showing, by way of example, an effect-setting view;

FIG. 6 is a diagram showing, by way of example, a disk readout view;

FIG. 7 is a diagram showing page 2 of a help view for a split switch;

FIG. 8 is a diagram showing, by way of example, page 2 of a help view for a pad switch;

FIG. 9 is a diagram showing, by way of example, page 3 of the help view for the pad switch FIG. 10 is a diagram showing, by way of example, a help view for an effect switch;

FIG. 12 is a diagram showing, by way of example, page 1 of a help view for a normal view;

FIG. 13 is a diagram showing, by way of example, page 2 of the help view for the normal view;

FIG. 14 is a diagram showing, by way of example, page 1 of a help view for the disk readout view;

DETAILED DESCRIPTION

The invention will now be described in detail with reference to the drawings showing a preferred embodiment thereof.

Figure 1:
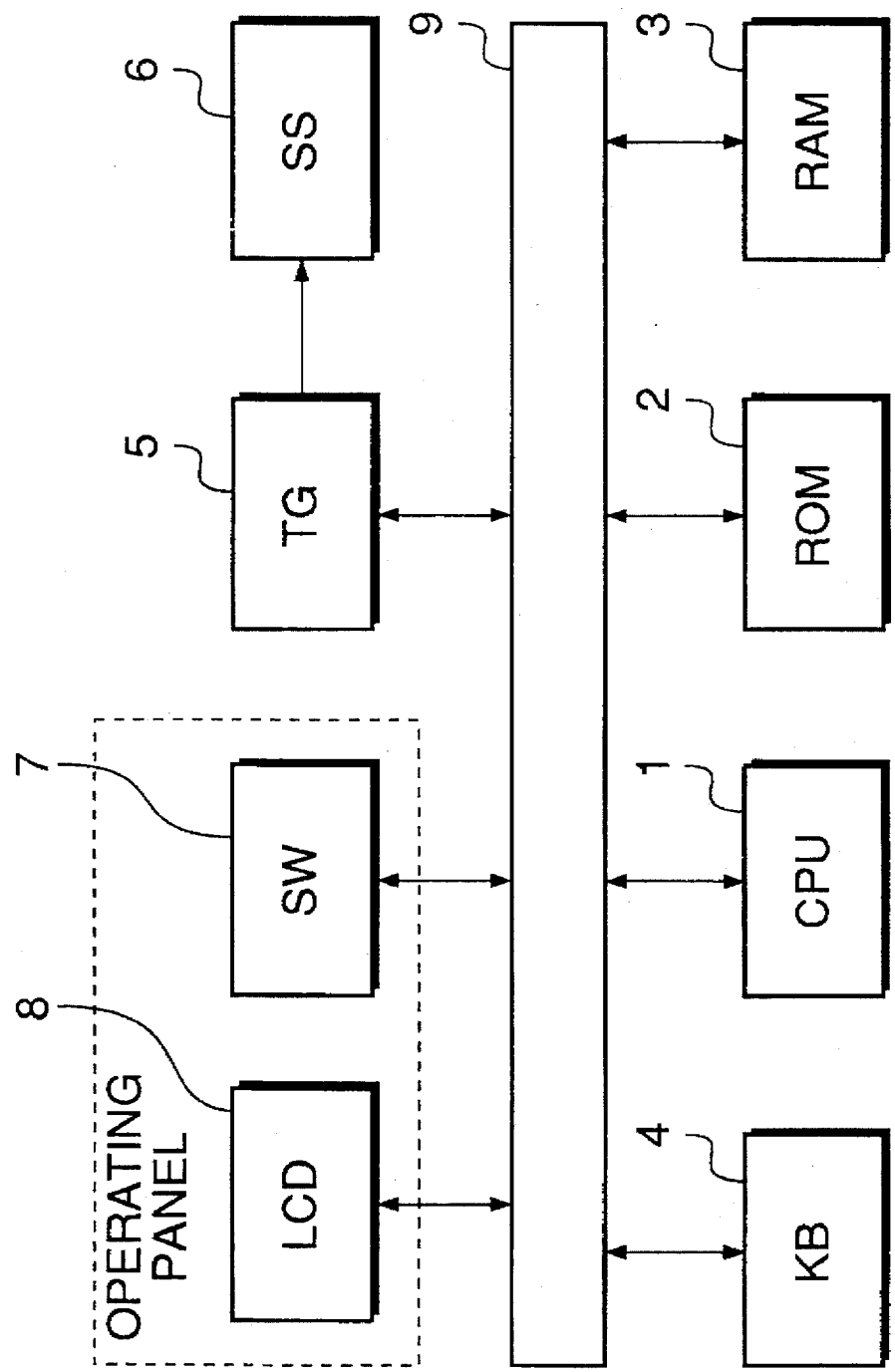
FIG. 1 is a block diagram schematically showing the whole arrangement of an electronic musical instrument as an information processing apparatus according to an embodiment of the invention.

Referring first to FIG. 1, there is shown the whole arrangement of an electronic musical instrument as an information processing apparatus according to an embodiment of the invention.

In the figure, the electronic musical instrument according to the present embodiment is mainly comprised of a CPU 1 for controlling the whole instrument, a ROM 2 storing a control program executed by the CPU 1, etc. a RAM 3 for temporarily storing results of calculations, etc., a tone generator TG) 6, a sound system (SS) 6, a panel operating switch group (SW) 7, and a liquid-crystal display (LCD) 8. These component elements are connected to each other via a bus 9.

The CPU 1 controls the whole element musical instrument by using a working area within the RAM 3, based on the control program stored in the ROM 2. For example, it operates in response to performance information such as a key code signal and a key-on signal, and delivers musical tone control data to the tone generator (TG) 5. Responsive to the musical tone control data, the tone generator (TG) 5 generates a musical tone signal and delivers the same to the sound system (SS) 6 to generate musical tones.

Further, the CPU 1 detects operation events of various switches of the panel operating switch group (SW) 7 which are arranged on an operating panel of the electronic musical instrument, and carries out processings corresponding to the detected operation events, while carrying out control of changing a view displayed on the liquid-crystal display (LCD) 6 which has a graphic display screen.

The electronic musical instrument according to the present embodiment is constructed such that keys of the keyboard 4 are virtually divided into two key areas for which can be set two kinds of voices (tone colors), i.e. "ORCHESTRA 1" and "ORCHESTRA 2", respectively. The split point between the two key areas can be set to any desired point by designation. Further, the voices "ORCHESTRA 1" and "ORCHESTRA 2" can each be shifted by octave.

Figure 2:
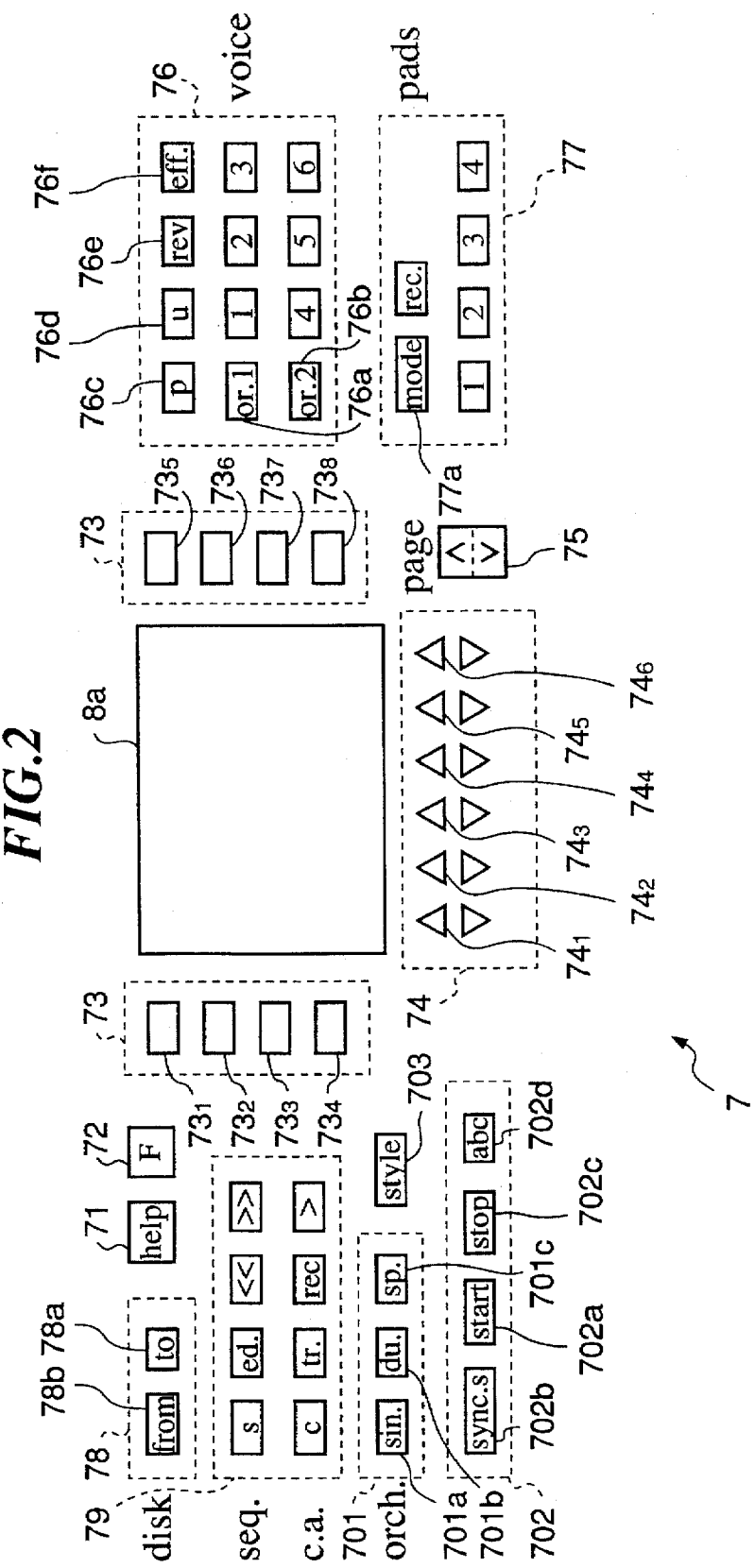
FIG. 2 is a diagram showing an operating panel of the electronic musical instrument of FIG. 1.

FIG. 2 shows an operating panel of the electronic musical instrument according to the embodiment. Provided at a substantially central portion of the operating panel is a display screen 8a of the liquid-crystal display 8, at opposite sides and a lower side of which are arranged various switches forming the panel operating switch group 7.

The panel operating switch group 7 is comprised of a help button 71, an "F" switch 72, a view switch 73, an "UP/DOWN" switch 74, a page switch 75, a voice switch 76, a pad switch 77, a disk switch 78, a sequencer/custom accompaniment switch 79, an orchestration switch 701, a start/stop switch 702, and a style switch 703.

The help button 71 serves as a help operating element for designating various help functions. If the help button 71 is operated and then one of the above switches is operated, a help view will appear on the display screen 8a, which indicates explanations and/or instructions concerning the operated switch.

The "F" switch 72 is for changing the display to a function-selecting view, as hereinafter described, and the view switch 73 for selecting a function view when the function-selecting view is displayed on the display screen 8a. The view switch 73 has its function changed according to information displayed on the display screen 8a.

The "UP/DOWN" switches 74 is comprised of six switches 741–746 for carrying out setting operations according to information displayed on the display screen 8a. That is, functions according to the information displayed on the display screen 8a are assigned to the "UP/DOWN" switches 741–746. The page switch 75 is for changing the page of a help view when a help function is selected.

The voice switch 76 is for selecting the voice "ORCHESTRA 1" or the voice "ORCHESTRA 2". That is, it includes an "or. 1" switch 76a for designating the voice "ORCHESTRA 1", and an "or. 2" switch 76b for designating the voice "ORCHESTRA 2". Each of the voices is comprised of a preset group of voices and a user set group of voices, which are designated by a switch 76c and a switch 76d, respectively. Further, selection of voices of the group designated is made by "1" to "6" switches and the view switch. Setting of reverberation to the selected voice is made by a "rev" switch 76e, and setting of on/off of effect is made by an "eff." switch 76f.

The pad switch 77 is comprised of a mode switch 74a, and "1" to "4" switches which are set to perform functions corresponding to modes set by the mode switch 77a. The functions include a multiple pad function of storing and reproducing performance data, a percussion pad function of cataloguing and reproducing percussion sound data, and a tempo pad function of controlling the tempo. Therefore, when the help function is performed, different views are indicated on the display screen 8a, which correspond to respective different functions assigned to the "1" to "4" switches.

The disk switch 78 is comprised of a "to" switch 78a for storing tone color data and performance data into a disk, and a "from" switch 78b for restoring or reading data from the disk. When the switch 78a or 78b is operated to perform the function, the display on the display screen 8a is changed to a view showing a list of files stored in the disk currently inserted in the musical instrument.

The sequencer/custom accompaniment switch 79 is operated during control of automatic accompaniment or the like.

The orchestration switch 701 is comprised of a "sin." switch 701a for enabling only the voice "ORCHESTRA 1", and a "du." switch for enabling both the voices "ORCHESTRA 1" and "ORCHESTRA 2" to cause concurrent sounding of the voices, and a "sp." switch 701c for dividing the keys of the keyboard at the split point and individually enabling the voices "ORCHESTRA 1" and "ORCHESTRA 2" set in the respective divided key areas.

The "sin." switch 701a, "du." switch 701b, and "sp." switch 701c have a common help view to be displayed when the help function is performed. If the help switch 71 is operated when a view of the common view is displayed through operation of one of the above switches 701a to 701c, the display is changed to another view of the common help view for another one of the switches 701a to 701c. More specifically, the common help view usually extends over a plurality of pages. If a help operation is made for each of the switches 701a to 701c, a page of the common help view is displayed, which indicates explanations and/or instructions corresponding to the each switch. Further, on this occasion, by operating the page switch 75, other pages of the common help view indicating explanations and/or instructions corresponding to the respective switches 701a to 701c are sequentially displayed.

Also the start switch 702 is comprised of a start switch 702a for starting automatic performance, a "sync. s" switch 702b for starting automatic performance in synchronism with an operation of the keyboard, a stop switch 702c for stopping automatic performance, and an "abc" switch 702d for controlling turning-on or -off of automatic performance mode.

Also the start switch 702a, "sync. s" switch 702b, stop switch 702c, and "abc" switch 702d have a common help function to be displayed when the help function is performed, similarly to the orchestration switch 701. That is, if a help operation is made for each of the switches 702a to 702d, a page of the common help view is displayed, which indicates explanations and/or instructions corresponding to the each switch. Further, on this occasion, by operating the page switch 75, other pages of the common help view indicating explanations and/or instructions corresponding to the respective switches 702a to 702d are sequentially displayed.

The style switch 703 is for causing the instrument to enter a mode for displaying a view for selecting the style of rhythm or automatic performance.

Figure 3:
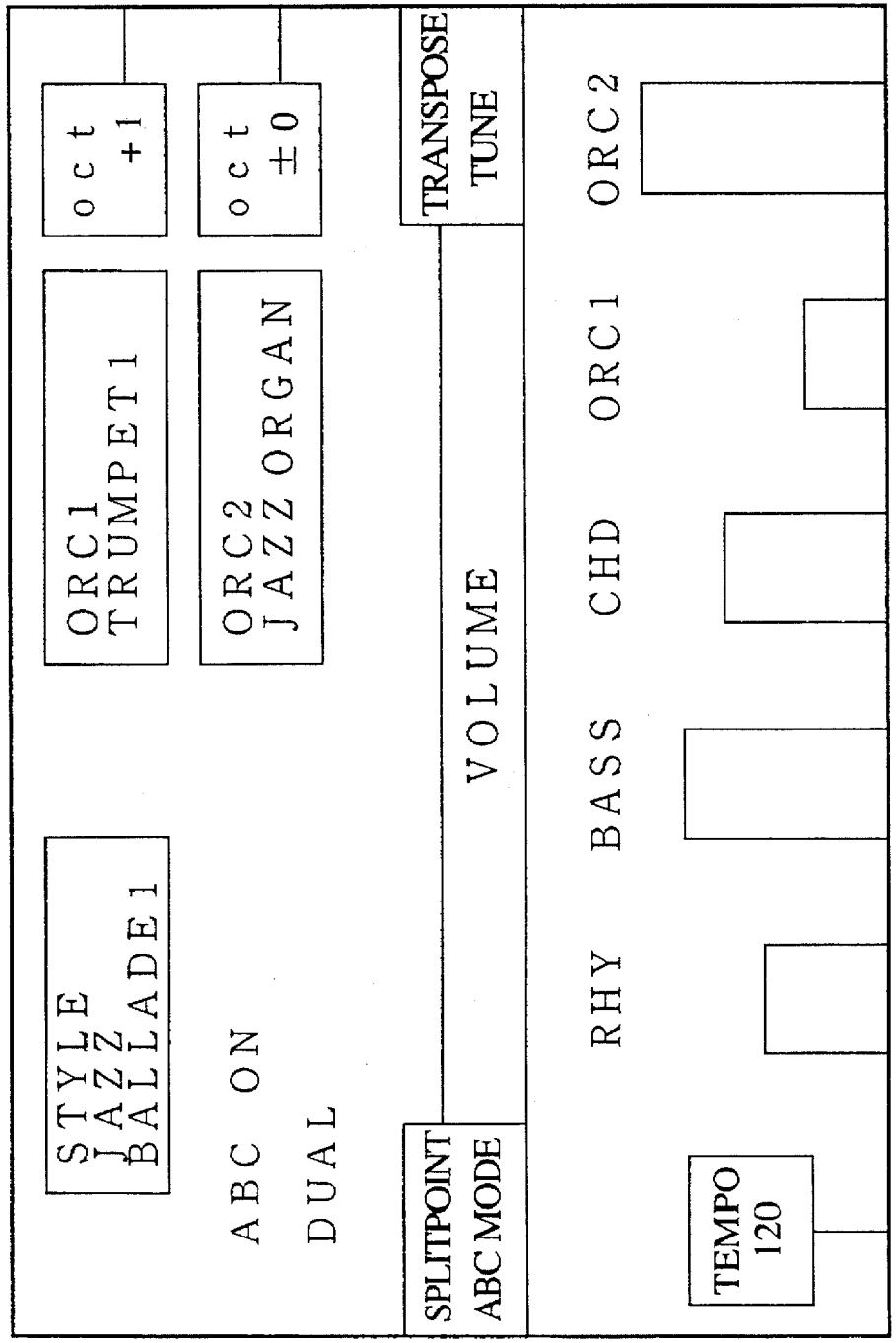
FIG. 3 is a diagram showing, by way of example, a normal view.

In the present embodiment, when a power switch, not shown, of the instrument is closed, normally a normal view in FIG. 3 is displayed on the display screen 8a. At this time, a function of setting octave shifting of the voice "ORCHESTRA 1" is assigned to the view switch 735, and a function of setting octave shifting of the voice "ORCHESTRA 2" to the view switch 736, respectively. Further, a function of setting the tempo is assigned to the "UP/DOWN" switch 741, and a function of setting the volume of respective performance tracks to the "UP/DOWN" switches 742 to 746, respectively.

By operating the "F" switch 72 while the normal view in FIG. 3 is displayed, the display is changed to a function-selecting view as shown in FIG. 4. On the function-selecting view, eight function blocks BF1–BF8 are indicated, which are selected by operating respective corresponding switches of the view switch 73, whereby function views corresponding to the selected functions are displayed.

For example, if the view switch 732 is operated while the function-selecting view in FIG. 4 is displayed, the display is changed to an effect-setting view as shown in FIG. 5, whereby various effects can be set. Further, when any view is displayed, if the "from" switch 78b is operated, the display is changed to a disk readout view as shown in FIG. 6, whereby data can be read out from the disk.

FIG. 7 to FIG. 14 show examples of help views according to the present embodiment. Of these figures, FIG. 7 to FIG. 11 show an example of help views displayed when a help function "Button Help" for various switches mentioned above, and FIG. 12 to FIG. 14 show an example of help views displayed when a help function "view Help" for information displayed on the display screen 8a and setting operations using the same information.

Referring first to FIG. 7, there is displayed page 2 of a help view for the "sp." switch 701c, wherein explanations and instructions on the meaning of the split point and how to set the split point "SPLIT" are indicated. Further indicated on this help view at a right lower portion thereof is a block BJ in the form of a "J" button as a jumping means for shifting the mode to a mode "SPLIT POINT/ABC MOD" for actually setting the split point. If the view switch 738 corresponding to the block BJ in the form of the "J" button, a view entitled "SPLIT POINT/ABC MOD" will appear on the screen, whereby setting of the split point can be made by operating the "sp." switch 701c.

FIG. 8 shows page 1 of a help view for the pad switch 77, and FIG. 9 page 3 of the same help view, respectively. On page 1 of the help view are indicated explanations and instructions on the multiple pad function of storing and reproducing performance data, while on page 3 are indicated explanations and instructions on the percussion pad function of cataloguing and reproducing percussion sound data.

When the multiple pad function is assigned to the pad switch 77, page 1 of the help view in FIG. 8 is initially displayed, while when the percussion pad function is assigned to the pad switch 77, page 3 of the same view in FIG. 9 is initially displayed. Further, on this occasion, by operating the page switch 75, other pages of the help view can be displayed.

FIG. 10 shows a help view for the "eff." switch 76f, wherein explanations and instructions on the function "EFFECT" to be selected by the "eff." switch 76f and present settings related to the function. Further indicated on this help view at a right lower portion thereof is a block BJ1 in the form of a "J1" button as a jumping means for shifting the mode to a mode "F2 EFFECT" for setting the effect. If the view switch 737 corresponding to the block BJ1 in the form of the "J1" button is then operated, the view entitled "F2 EEFECT" in FIG. 5 will appear on the screen, whereby setting of the effect type and the depth can be made.

Further indicated on the help view at a right lower portion thereof is a block BJ2 in the form of a "J2" button for shifting the mode to a mode "F4 CONTROLLER", which can be selected on the function-selecting view in FIG. 4. If the view switch 738 corresponding to the block BJ2 in the form of the "J" button2, a view entitled "F4 CONTROLLER" will appear on the screen, whereby setting operations of assigning the effect function to a wheel, etc. can be made.

Figure 11:
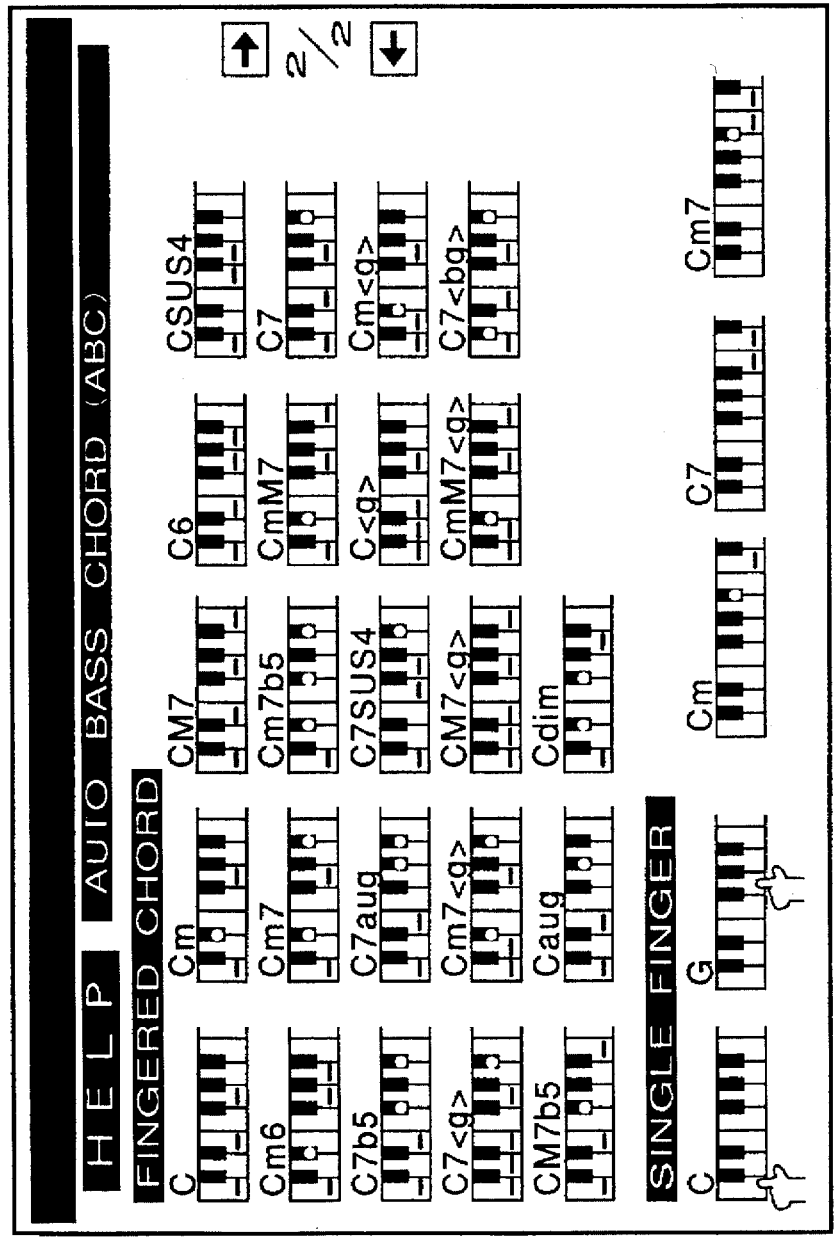
FIG. 11 is a diagram showing, by way of example, page 2 of a help view for an "abc" switch.

FIG. 11 shows page 2 of a help view for the "abc" switch 702d, on which are indicated a list of correspondence between chord names of a fingered chord "FINGERED CHORD" and key depression patterns, and a list of correspondence between chord names of a singer fingered chord "SINGLE FINGERED CHORD" and key depression patterns.

FIG. 12 shows page 1 of a help view for the normal view, on which are indicated explanations and instructions on the manner of using the help function, "How to use HELP", explanations on the manner of canceling the help function, "How to Quit HELP", and instructions on selection of a language to be displayed, "LANGUAGE" In the example of FIG. 12, "Japanese" is selected, and hence explanations and instructions in Japanese are displayed. "English" can be selected by operating the "UP/DOWN" switch to display explanations and instructions in English.

FIG. 13 shows page 2 of the help view for the normal view, on which are indicated explanations and instructions on the manner of using setting functions related to the volume on the normal view, "VOLUME", as well as explanations on the manner of setting the tempo, "TEMPO" Explanations and instructions on manners of using other setting functions on the normal view are indicated on other pages of the help view. Further indicated on the help view at a right shoulder portion thereof is an index indicative of "page/all pages", by which the present page and the number of all the pages can be ascertained. By operating the page switch 75, explanations and instructions on other pages can be sequentially displayed.

FIG. 14 shows page 1 of a help view for the disk readout view in FIG. 6, on which are indicated explanations and instructions on an operation "from DISK" of reading out data from the disk and loading the same into the RAM 3.

Data to be displayed on the above described help views are previously stored in the ROM 2 in a manner corresponding to the panel switch operating group 7 and the normal view, function-selecting view, function views, etc. (hereinafter referred to as the "function view(s)").

More specifically, the data to be displayed on the help views of the button help function are stored in a manner corresponding, respectively, to button numbers assigned to the respective switches of the pane operating switch group 7.

The data to be displayed on the help views of the view help function are stored in a manner corresponding, respectively, to indices indicative of respective function views. Indices indicative of help views and function views are comprised of indices for discriminating the kinds of views and indices for discriminating the page numbers.

FIG. 15 to FIG. 18 show a main routine of the control program and subroutines of the same. Essential parts of the control carried out by the present embodiment will now be described with reference to these figures. In the following description and the flowcharts of FIGS. 15 to 18 the following symbols are used to represent a flag used in the control, indices and data displayed on the display, processing programs, etc. The same symbols are used to represent the flag, indices and data displayed, and processing programs, etc., respectively, irrespective of the switches, functions, views, etc., unless otherwise specified:

HF: a flag indicating on/off of a help function;
B: a register for storing a button number
X: an index for discriminating the kind of a function view;
i: an index for discriminating the page number of a function view;
Y: an index for discriminating the kind of a help view;
j: an index for discriminating the page number of a help view;
S(X,i): data displayed on a function view;
H(Y,j): data displayed on a help view;
R(B): a processing program for a function corresponding to the button number B;
R1(X,i,B): a processing program corresponding to the button number of a view switch related to a function view (X,i);
R2(Y,j,B): a processing program corresponding to the button number of a view switch related to a help view (Y,j).

Figure 15:
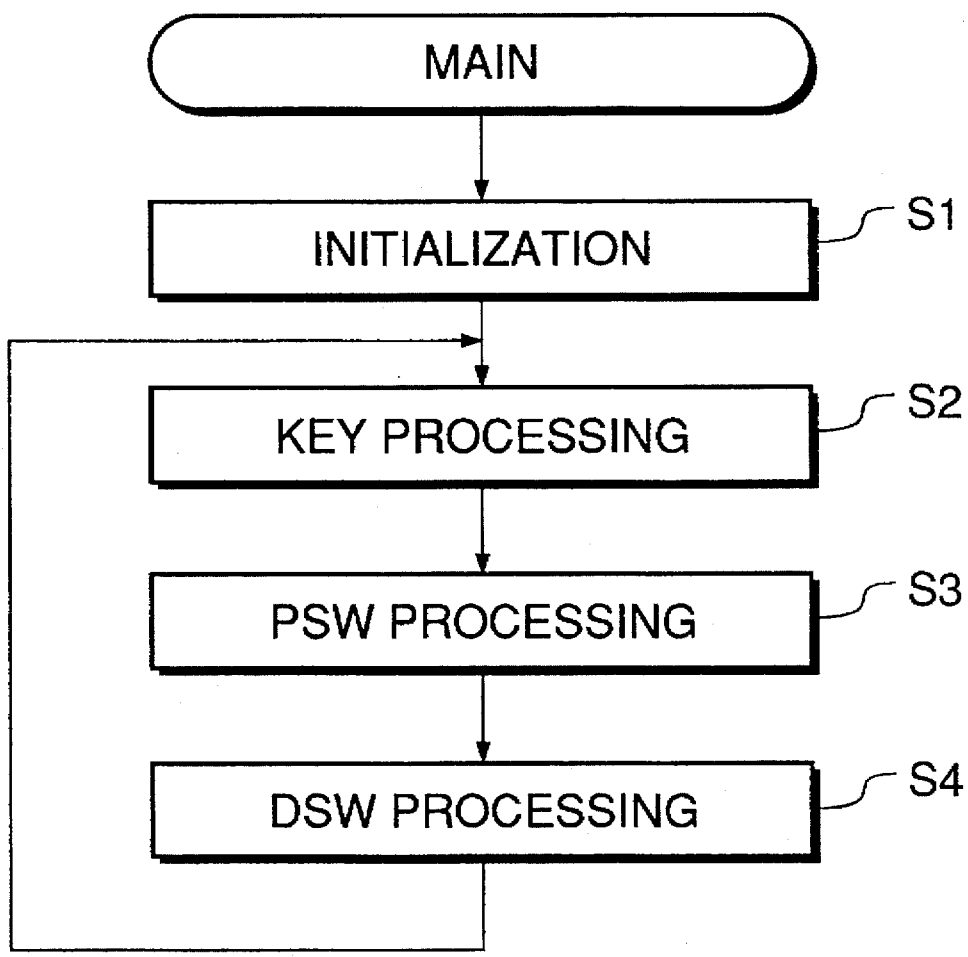
FIG. 15 is a flowchart showing a main routine carried out by the present embodiment.

When the main routine in FIG. 15 is started by the CPU 1 upon closure of the power switch, initializations of flags, registers, etc. are carried out at a step S1, and a key processing is carried out, such as detection of operation events of the keyboard 4, musical tone generation, and termination of musical tone generation. Then, a processing corresponding to normal switch events of the panel operating switch group 7 is carried out at a step S3, and a processing related to the view switches 73 and 74 of the panel operating switch group 7 is carried out at a step S4, followed by the program returning to the step S2 to repeatedly carry out the above-mentioned processings.

Figure 16:
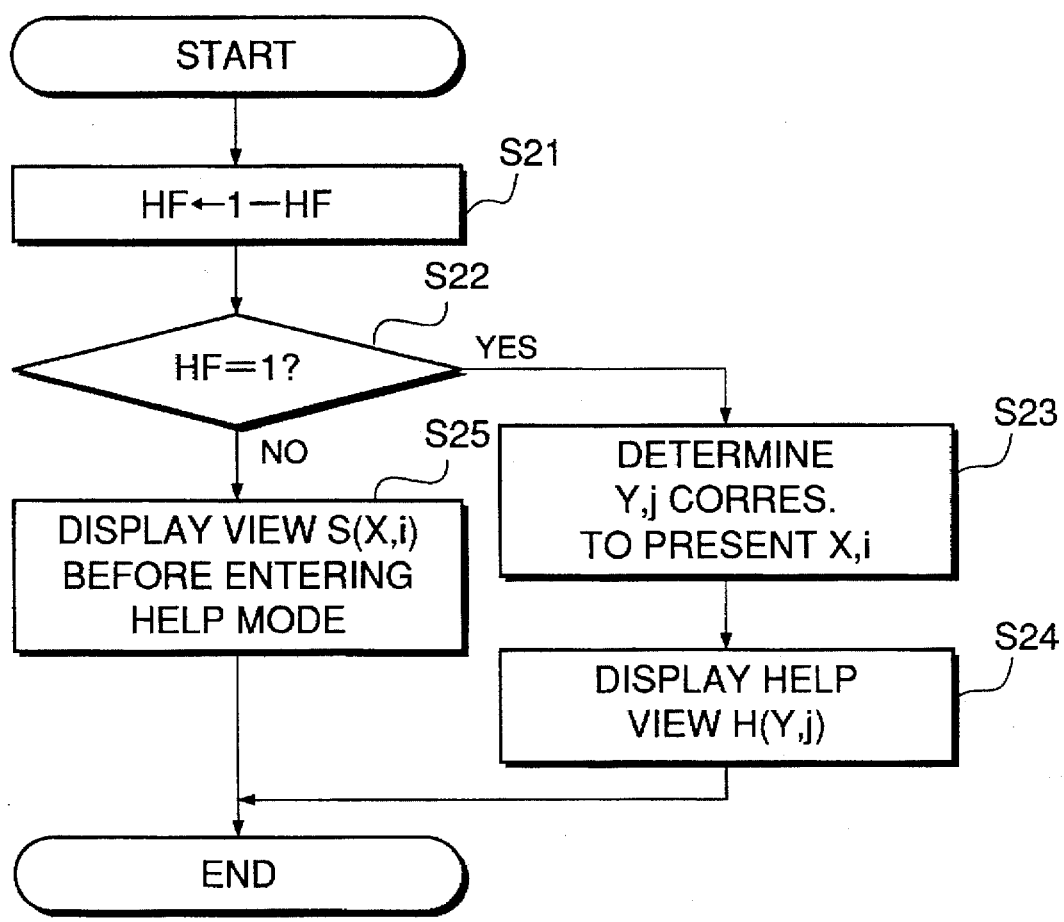
FIG. 16 is a flowchart showing a processing executed upon an on event of a help switch.

When an on event of the help switch 71 is detected at the step S3, a processing in FIG. 16 is started. First, the flag HF is inverted at a step S21, and it is determined at a step S22 whether or not HF=1 holds. If HF=1 holds, it means that a view help mode has been designated. Therefore, at a step S23 indices Y, j of a help view corresponding to indices X, i of the present function view are determined. Then, at a step S24 data H(Y,j) for the determined help view (Y,j) is displayed on the display screen 8a, followed by the program returning to the main routine.

If HF=1 does not hold at the step S22, it means that a view help mode designated before the inversion of the flag HF at the step S21 has been canceled. Therefore, the program proceeds to a step S25, wherein data S(X,i) for a function view (X,i) displayed before the view help mode was designated is displayed on the display screen 8a, followed by the program returning to the main routine.

Figure 17:
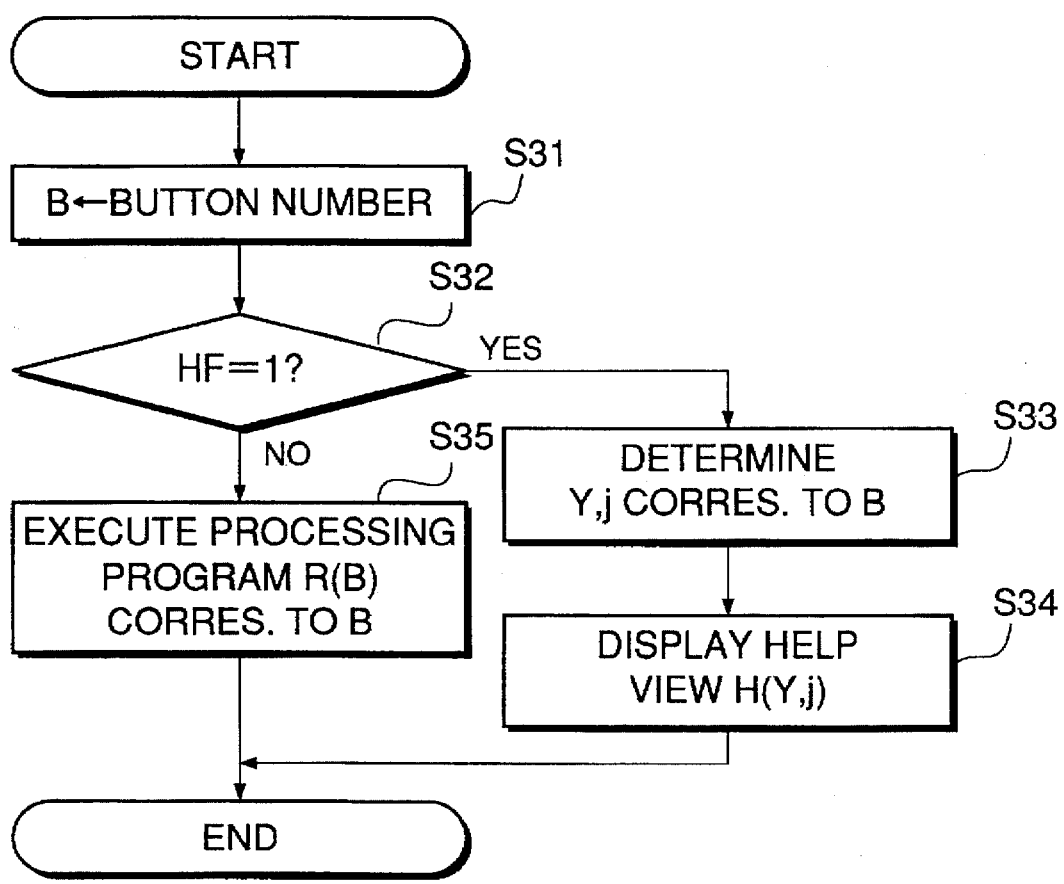
FIG. 17 is a flowchart showing a processing executed upon an on event of a panel switch other than the help switch.

When an on event of a switch other than the help switch 71 is detected at the step S3, a processing in FIG. 17 is started. First, the button number of the switch of which the on event is detected is stored into the register B, at a step S31. Then, it is determined at a step S32 whether or not HF=1 holds. If HF=1 holds, it means that a button help mode has been designated. Therefore, at a step S33 indices Y, j of a help view corresponding to the value of the button number B are determined. Then, at a step S34 data H(Y,j) for the determined help view (Y,j) is displayed on the display screen 8a, followed by the program returning to the main routine.

In this connection, in this button help mode, if the switch having the button number B, of which an on even is detected, can have a plurality of functions assigned thereto and a help view data H(Y,j) therefor extends over a plurality of pages corresponding to the number of functions which can be assigned to the switch, a page of the help view corresponding to the function presently assigned to the switch is displayed. Further, if the help view data H(Y,j) for the switch of the button number B detected extends over a plurality of pages for common use with other related switches, a page of the help view corresponding to the value of the button number B presently detected is displayed.

On the other hand, if HF=1 does not holds at the step S32, it means that a button help mode has not been designated but a normal switch operation has been made. Then, the program proceeds to a step S35, wherein a processing program R(B) corresponding to the value of the button number B is executed, followed by the program returning to the main routine.

Figure 18:
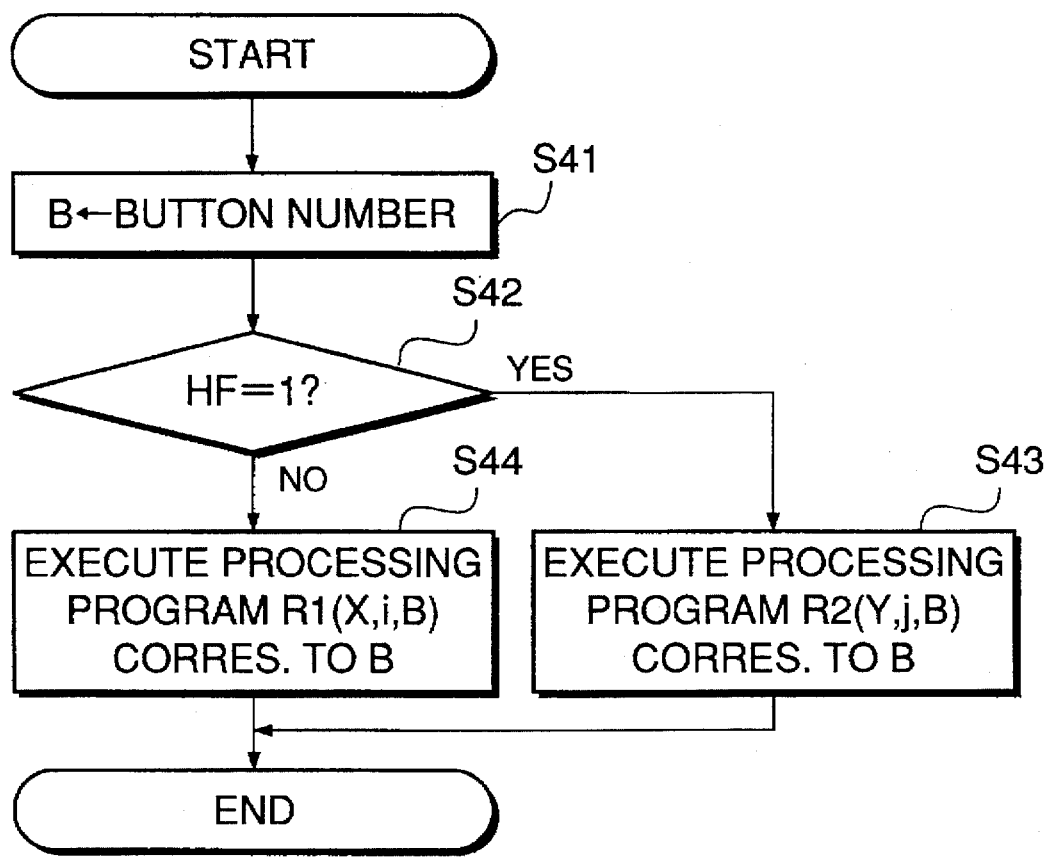
FIG. 18 is a flowchart showing a processing executed upon an on event of a view switch.

When an on event of the view switch 73 or 74 is detected at the step S4 of the main routine, a processing in FIG. 18 is started. First, the button number of the view switch of which the on event is detected is stored into the register B at a step S41, and then it is determined at a step S42 whether or not HF=1 holds. If HF=1 holds, a processing program R2(Y,j,B) corresponding to the value of the button number B is executed, and the flag HF is reset to "0" at a step S43, followed by the program returning to the main program.

The processing program R2(Y,j,B) executed at the step S43 is for carrying out a function through operation of the view switch, e.g. it is related to the "J" button appearing in FIG. 7 or the "J1" and "J2" buttons appearing in FIG. 10, and wherein display of a function view corresponding to the "j" button, the "J1" or "J2" button and other settings are carried out.

On the other hand, if HF=1 does not hold at the step S42, it means that a view switch operation has been made while a normal function view is displayed, and therefore at a step S44 a processing program R1(X,i,B) corresponding to the number of the button number B is executed to carry out processing of a function presently set to the view switch, followed by the program returning to the main routine.

In the above described manner, according to the present embodiment, by designating a view help mode while the normal view shown in FIG. 3 is displayed, a help view as shown in FIG. 12 or FIG. 13 can be displayed. Also, by designating a view help mode while the function view (disk readout view) shown in FIG. 6 is displayed, a help view as shown in FIG. 14 can be displayed. As a result, the operator can grasp a current state or mode in which the electronic musical instrument is operating, for example, what setting operation can be made.

Further, a help view related to a function presently set to an operating element, such as the help views related to the pad switch in FIGS. 8 and 9, is immediately or initially displayed, which makes it unnecessary to carry out an operation of searching for a page on which are indicated explanations and/or instructions for a particular switch for which help is desired by the operator. Moreover, since for example, a help view as shown in FIG. 10 is displayed by designating a button help mode related to the "eff." switch 76f, whereby the present setting of effects, e.g. "Type: tremolo 3, Depth: 20, . . . ", which can be selected by the "eff." switch 76f, can be visually recognized. Thus, the current settings of operating elements can be grasped with ease.

Further, by operating the "J", "J1" or "J2" button shown in FIGS. 7 and 10, in setting or operating an operating element related to a button help mode presently set, the operator can readily understand which operating element should be operated and/or how to operate the same.

The view help function and the button help function may be provided with a detailed help function for explanation of details of the help function, and/or an outline help function for explanation of the outline of the help function. For example, in the view help mode for the sequencer view, help switches may be displayed for selecting help functions entitled "To make sound recording", "To reproduce", "To save music", and respective operating manners may be displayed by operating corresponding view switches.

Although in the above described embodiment the information processing apparatus is applied to an electronic musical instrument, this is not limitative, but the invention may be applied to any other kinds of information processing apparatuses in general such as a personal computer, and a word processor.

Further, although the above described embodiment realizes all the features claimed in the appended claims, it goes without saying that the invention may be implemented by any embodiment insofar as it realizes at least one of the claimed features.

What is claimed is:

1. An information processing apparatus comprising:
   display means having a display screen;
   a plurality of function operating elements for designating execution of a plurality of functions, respectively;
   a help operating element for one-step designation of display of explanations and/or instructions related to information displayed on said display screen of said display means; and
   control means responsive to operation of said help operating element, for controlling said display means to display explanations and/or instructions related to said information displayed on said display screen, on said display screen of said display means;
   said control means in addition being responsive to operation of each of said function operating elements taking place during said display of said explanations and/or instructions responsive to said operation of said help operating element, for controlling said display means to display explanations and/or instructions related to said each function operating element, on said display screen of said display means.

2. An information processing apparatus comprising:
   display means having a display screen;
   a first plurality of function operating elements for designating execution of a plurality of functions, respectively;
   a help operating element for one-step designation of display of explanations and/or instructions related to information displayed on said display screen of said display means; and
   control means for controlling said display means to selectively display on said display screen of said display means explanations and/or instructions related to a second plurality of mutually related function operating elements of said first plurality of function operating elements, which extend over a plurality of pages corresponding, respectively, to said second plurality of function operating elements;
   said control means in addition being responsive to operation of said help operating element and operation of each of said mutually related function operating elements concomitant with said operation of said help operating element, for controlling said display means to immediately display a page of explanations and/or instructions corresponding to said each function operating element, on said display screen of said display means.

3. An information processing apparatus comprising:
   display means having a display screen;
   a plurality of function operating elements for designating execution of a first plurality of functions, respectively;
   assigning means for selectively assigning a second plurality of functions to each of at least one of said function operating elements;
   a help operating element for one-step designation of display of explanations and/or instructions related to information displayed on said display screen of said display means; and control means for controlling said display means to selectively display on said display screen of said display means explanations and/or instructions related to said second plurality of functions assignable to said each of said at least one function element, which extend over a plurality of pages corresponding, respectively, to said second plurality of functions;

said control means in addition being responsive to operation of said help operating element and operation of said each of said at least one function operating element concomitant with said operation of said help operating element, for controlling said display means to immediately display a page of explanations and/or instructions corresponding to one of said second plurality of functions which is currently assigned to said each of said at least one function operating element, on said display screen of said display means.

4. An information processing apparatus comprising:

display means having a display screen;

a plurality of function operating elements for designating execution of a first plurality of functions, respectively;

assigning means for selectively assigning a second plurality of functions to each of at least one of said function operating elements;

a help operating element for one-step designation of display of explanations and/or instructions related to information displayed on said display screen of said display means in additions; and control means responsive to operation of said help operating element and operation of said each of said at least one function operating element concomitant with said operation of said help operating element, for controlling said display means to display explanations and/or instructions related to one of said second plurality of functions which is currently assigned to said each of said at least one function operating element, on said display screen of said display means.

5. An information processing apparatus comprising:

display means having a display screen;

a plurality of function operating elements for designating execution of a first plurality of functions, respectively;

assigning means for selectively assigning a second plurality of functions to each of at least one of said function operating elements;

a help operating element for designating display of explanations and/or instructions related to information displayed on said display screen of said display means;

view-jumping means for designating changing a view to be displayed on said display screen of said display means, to a new view corresponding to another function related to said explanations and/or instructions displayed on said display screen; and control means responsive to operation of said help operating element and operation of each of said at least one function operating element concomitant with said operation of said help operating element, for controlling said display means to display explanations and/or instructions related to said second plurality of functions which are assignable to said each of said at least one function operating element, on said display screen of said display means;

said control means being responsive to operation of said view-jumping means taking place during said display of said explanations and/or instructions responsive to said operation of said help operating element and said operation of said each of said at lest one operating element, for controlling said display means to display a setting view for executing assignment of one of said second plurality of functions to said each of said at least one function operating element, on said display screen of said display means.

* * * * *